Nov. 20, 1962     L. H. LEONARD, JR     3,064,450
ABSORPTION REFRIGERATION SYSTEMS
Filed Dec. 27, 1960
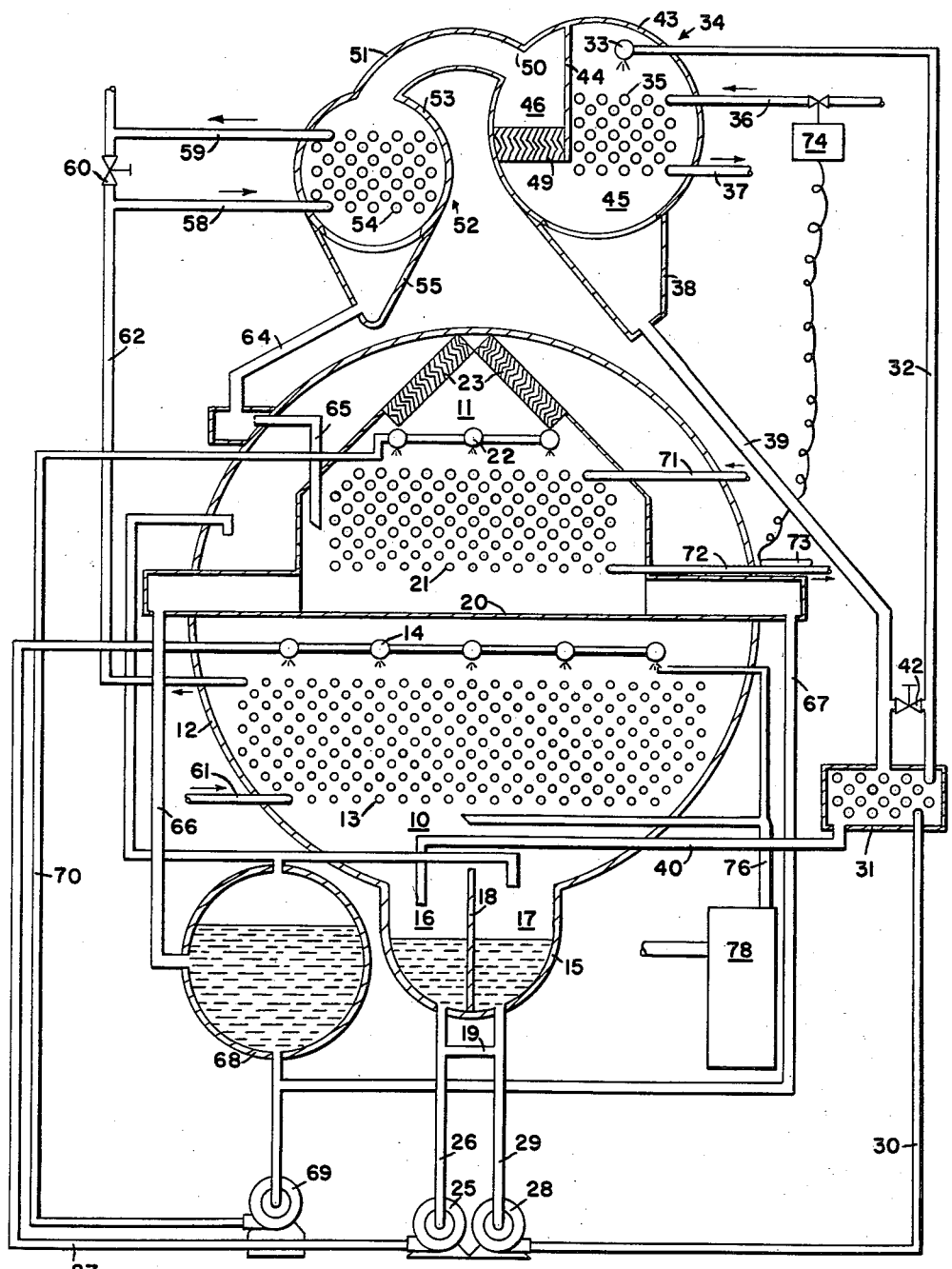
*INVENTOR.*
LOUIS H. LEONARD JR.
ATTORNEY.

United States Patent Office 3,064,450
Patented Nov. 20, 1962

3,064,450
ABSORPTION REFRIGERATION SYSTEMS
Louis H. Leonard, Jr., De Witt, N.Y., assignor to Carrier Corporation, Syracuse, N.Y., a corporation of Delaware
Filed Dec. 27, 1960, Ser. No. 78,546
7 Claims. (Cl. 62—497)

This invention relates to absorption refrigeration systems and more particularly to an absorption refrigeration machine adapted for use under conditions where it may be required to provide refrigeration in a plurality of angular conditions such as in a shipboard installation.

In recent years, there has been an increasing recognition of the many inherent advantages in utilizing absorption refrigeration machinery to provide cooling aboard naval ships and other vessels. The utilization of absorption refrigeration is singularly advantageous aboard submarines or other vessels which may be required to operate undetected for long periods of time and wherein heavy heat loads must be dissipated.

A major advantage of absorption refrigeration under these circumstances is its inherent quietness due to the lack of moving parts within the machine itself. The only moving mechanical parts which are required by an absorption refrigeration system are the various pumps, and suitable techniques for silencing the operation of these pumps are known to those skilled in the art. Another major advantage of an absorption refrigeration system aboard ship is that such a system utilizes steam, which is readily available, as the power input to the system. In addition, the usual refrigerant is water and the absorbent may be a lithium bromide solution, both of which are nontoxic and safe to use in confined areas even if leakage should result from damage to the machine.

Conventional absorption refrigeration machines, however, are not well suited to shipboard use because they are unable to operate properly when subjected to the pitch and roll conditions under which they would be required to perform in such installation. A conventional absorption refrigeration machine has an absorber, an evaporator, a generator and a condenser, each of which comprises a vessel or pan-like member with a liquid level maintained therein. If such a machine is tilted so that the pans or vessels are at a substantial angle to the horizontal, the solutions therein tend to mix and foul the operation of the system. For example, a conventional machine under severe conditions of pitch and roll may drain substantial quantities of liquid from the condenser back into the generator and may tend to drain refrigerant from the evaporator into the absorber, both of which conditions would result in lack of capacity and render the machine unsatisfactory for its intended purpose. In addition, absorbent solution in a submerged tube type generator of a conventional absorption refrigeration machine, which is subjected to operation in an angular position, is likely to be sloshed into the condenser from which it may be passed to the evaporator where it would seriously impair the functioning of the refrigeration system.

Furthermore, operation under severe angular conditions such as encountered aboard ship will cause the liquids in a conventional absorption refrigeration machine to accumulate at one end or one side of their respective vessels or pan-like members. Since each of the vessels or pan-like members are in effect heat exchangers having a plurality of heat exchange tubes therein, the accumulation of the liquids at one end or side of these vessels or pans greatly reduces the amount of effective heat exchange surface in contact with the liquids. This not only further contributes to the inability of the machine to provide adequate refrigeration capacity, but also leads to problems such as solution and refrigerant carryover and contamination.

One solution to the problem of providing an absorption refrigeration machine which will adequately perform under severe conditions of pitch and roll is to provide a spray type generator and maintain the level of solutions in each of the vessels as low as possible. However, spray type generators of previously known design have not been entirely satisfactory for their intended purpose of separating refrigerant from absorbent solution. Essentially, the problem has been the tendency of refrigerant vapor, driven off from weak solution supplied to the generator through the sprays, to entrain a substantial quantity of droplets of weak solution which are then passed to the condenser with the refrigerant vapor. This problem is particularly acute in generators of the type wherein the incoming weak solution is sprayed against or opposite to the direction of removal of refrigerant vapor from the condenser; this has been likened to "spitting into the wind." The resulting mixture in the condenser of condensed refrigerant and weak absorbent is passed to the evaporator where the absorbent contaminates the refrigerant and, being non-volatile, the absorbent tends to build up in increasing concentration in the evaporator, which seriously impairs the functioning of the refrigeration system by reducing evaporation of refrigerant from the evaporator. For a spray type generator to give satisfactory performance, a more efficient entrained solution eliminating construction was required to effectively prevent entrance of concentrated solution from the generator into the condenser.

An additional disadvantage of conventional absorption refrigeration machines is their lack of adaptability to a confined space. For example, a conventional machine is difficult to fit into the restricted quarters of a submarine by reason of its excessive height. It would be desirable, therefore, to separate the condenser and the generator not only to prevent contamination problems but also to reduce the height of the refrigeration machine.

Accordingly, it is an object of this invention to provide an absorption refrigeration machine which is adapted for use in a plurality of angular positions such as might be encountered aboard ship.

It is a further object of this invention to provide an improved generator for an absorption refrigeration machine.

It is a still further object of this invention to provide a spray type generator providing improved entrainment elimination means.

It is a still further object of this invention to provide an improved absorption refrigeration machine and system wherein contamination of refrigerant by absorbent solution is minimized under severe conditions of operation in a plurality of angular positions.

It is a still further object of this invention to provide an improved absorption refrigeration machine which can be accommodated in relatively confined areas.

In the illustrated preferred embodiment, these and other objects of this invention are achieved by providing a specially constructed generator and condenser arrangement with means to prevent accumulation of solution therein. A generator constructed in accordance with one embodiment of this invention comprises a vessel divided into first and second compartments by a vertically extending partition means. A tube bundle is disposed within the first compartment which is in communication with the second compartment adjacent the lower portions of the compartments. Weak solution is sprayed through a spray header located above the tube bundle and steam is passed through the tubes in the bundle, vaporizing refrigerant therefrom, thereby concentrating the weak solution. The concentrated or strong solution is passed back to the absorber for reabsorption of refrigerant and the refrigerant vapor is passed downwardly through the tube bundle in the first compartment and upwardly through the second compartment to a separate condenser vessel. The tubes in the tube bundle of the first compartment serve as an eliminator to remove entrained solution from the refrigerant vapor and an additional eliminator may be disposed within the second compartment. Separation is also achieved by centrifugal force due to the mixture of solution droplets and refrigerant vapor making a 180° bend in passing from the generator tube bundle to the outlet of the generator.

These and other objects of this invention will become apparent by reference to the attached specification and drawing wherein:

The FIGURE is a diagrammatic view of an absorption refrigeration machine including a generator constructed in accordance with the instant invention.

Referring to the drawing, there is illustrated an absorption refrigeration system constructed in accordance with a preferred embodiment of this invention. The absorption refrigeration system comprises an absorber section 10 and an evaporator section 11 located within shell 12. A plurality of heat exchange tubes 13 adapted to pass cooling water are located within the absorber section. A spray system 14 comprising a plurality of headers and suitable spray nozzles is located above tubes 13 for the purpose of discharging a finely divided spray of absorbent solution thereover.

As used herein the term "strong solution" refers to a solution strong in absorbing power and the term "weak solution" refers to a solution weak in absorbing power. The term "intermediate concentration" is used to designate a solution having a concentration intermediate the concentration of weak and strong solutions.

A suitable refrigerant for a system of the type herein described comprises water and a suitable absorbent solution comprises a solution of lithium bromide and water. The concentration of lithium bromide leaving the generator may desirably be about 65%.

Adjacent the lower portion of shell 12 and absorber section 10 is a sump 15 which is divided by vertically extending partition means 18 into an intermediate strength absorbent solution sump 16 and a weak absorbent solution sump 17. Both sumps collect absorbent solution sprayed over tubes 13 and sump 16 in addition receives strong solution from generator 34 which mixes therein to form absorbent solution of intermediate strength. A bypass line 19 may be provided to equalize fluid levels in the two sumps if desired. While for purposes of illustration, partition 18 has been shown as extending longitudinally of the machine, it will be appreciated that the illustration is schematic in nature and that partition 18 may extend transversely across sump 15 if desired.

Evaporator section 11, which is also located within shell 12, comprises a pan or vessel 20 within which are disposed a plurality of heat exchange tubes 21 which are adapted to carry a chilled fluid such as water to suitable heat exchangers located remotely from the refrigeration machine to provide cooling or dehumidification in the desired areas. Disposed above tubes 21 in the evaporator section is a suitable refrigerant distributor 22 which may include a plurality of headers each having a number of sprays in communication therewith to evenly distribute refrigerant over heat exchange tubes 21.

Pan 20, as illustrated in the drawing, has relatively high vertically extending walls to prevent transfer of refrigerant in the liquid state directly to the absorber section even when disposed at substantial angles to their normal position. The vertically extending walls of pan 20 terminate in eliminators 23 which provides a tortuous path for the passage of refrigerant vapor on its way to the absorber and thereby remove droplets of liquid refrigerant from spray system 22 which may have become entrained in the refrigerant vapor. Pump 25 passes accumulated absorbent solution of intermediate concentration from sump 16 through lines 26 and 27 to spray system 14 to maintain a continuous spray of absorbent solution over tubes 13.

Pump 28 passes absorbent solution relatively weak in absorptive capability through lines 29 and 30 to solution heat exchanger 31. Line 32 passes the weak solution from solution heat exchanger 31 to refrigerant distribution means 33 of generator 34. Distribution means 33 may suitably comprise a header having a plurality of spray nozzles in communication therewith disposed above tube bundle 35.

Generator 34 comprises a shell 43 having vertically extending partition means 44. Partition 44 may be secured to the upper portion of shell 43 and divides the generator into a first compartment 45 and a second compartment 46. Heat exchange tube bundle 35 is disposed within first compartment 45. Steam inlet 36 and a steam and condensate outlet 37 is provided to pass steam through the heat exchange tubes within tube bundle 35. A sump 38 having angular side walls is disposed adjacent the lower portion of shell 43 adjacent at least one end thereof and serves to receive strong solution concentrated by the generator and pass it through line 39 to heat exchanger 31. Preferably, sump 38 comprises a pair of sumps at each end of shell 43 each connecting with line 39 and extending below the bottom of shell 43 as shown in the drawing.

Warm strong solution is passed from generator 43 through line 39 to solution heat exchanger 31 and is cooled by heat exchange with cold weak solution passing through the heat exchanger from line 30 to line 32 on its way to the generator. The cooled strong solution is then passed from heat exchanger 31 through line 40 into intermediate absorbent concentration solution sump 16 of absorber 10. Upon being discharged into sump 16 the strong solution is further cooled by flashing due to the lower pressure in absorber 10 than exists in generator 34. Sump 38 and line 39 and 40 are sized so as to substantially prevent accumulation of solution in generator 34 while permitting gravity return of the strong solution into sump 16.

First compartment 45 and second compartment 46 of generator 34 are in communication with each other adjacent their respective lower portions because partition means 44 extends only part way down from the top of shell 43. The construction described herein is merely illustrative of a preferred generator embodiment and it will be appreciated that the generator may take various other forms wherein a first and a second compartment are in communication with each other adjacent their lower portions.

It will be observed that first compartment 45 and second compartment 46 of generator 34 have a substantially common bottom portion. It is desirable that a sump 38 be located adjacent each end of tubular shell 43 so as to substantially completely drain liquid from the bottom of the generator regardless of its angular position. As weak solution is sprayed through distribution means 33 over the heat exchange tubes in tube bundle 35, the refrigerant vapor driven off passes downwardly through the tube bundle along with concentrated absorbent solution. Since the absorbent solution is at its saturation temperature, little, if any, reabsorption of vaporized refrigerant is possible. The refrigerant vapor is, therefore, passed downwardly through tube bundle 35 in first compartment 45, turned 180° and then passed upwardly through eliminator 49 in second compartment 46 from which it passes through line 51 to condenser 52.

As refrigerant vapor passes downwardly in first compartment 45, it tends to entrain a quantity of droplets of concentrated solution in the vapor stream. As the stream of vapor and entrained droplets of solution pass through the heat exchange tubes in bundle 35, the droplets having less mobility than the refrigerant vapor tend to strike and remain by surface tension on the exterior of the heat exchange tubes. Eventually, these droplets coalesce into larger droplets, which, because of their relatively great mass drop directly into sump 38. Consequently, it will be seen that the heat exchange tubes in tube bundle 35 effectively serve as an eliminator removing entrained solution from the liberated refrigerant vapor.

Under certain operating conditions, spray nozzles 33 tend to form a finely divided spray or mist producing very small particles of weak absorbent solution which, because of their relatively small size are extremely difficult to eliminate with a conventional impingement type eliminator. If the refrigerant vapor boiled off by the generator were to be removed from the top of generator tube bundle 35 as is done in conventional type absorption machines, and other spray type generators, then substantial carryover of weak solution into the condenser would result from entrainment of these small particles in the refrigerant vapor leaving the generator. In addition to contaminating the refrigerant in the condenser and eventually reducing the evaporation of refrigerant from the evaporator, this carryover of small particles would greatly impair wetting the heat exchange tubes in the generator which would reduce the effectiveness of the generator.

In a generator construction of the type herein described, the flow of refrigerant driven off from weak absorbent sprayed over generator tube bundles 35 is in the same direction as the passage of the weak absorbent, namely, downwardly through tube bundle 35. This construction results in utilizing the tubes in the generator tube bundle as an eliminator. Since these finely divided particles of weak absorbent solution impinge upon the surface of the tube bundle and coalesce into larger droplets which are more easily eliminated, a concomitant advantage of this arrangement is that very thorough wetting of the tube bundle in the generator is necessarily achieved and therefore the generator operates at maximum efficiency.

Furthermore, refrigerant vapor driven off in the generator, after being partially eliminated of entrained absorbent solution by the tube bundles, is required to turn 180° around partition 44 in order to enter second compartment 46. This results in centrifugal forces being exerted upon any remaining entrained particles of absorbent vapor and elimination thereof by impingement on the interior wall of shell 43. The optional impingement type entrainment eliminator 49 is, therefore, required to do very little elimination and consequently, does not become clogged with solution as would be the case in more conventional type systems where the eliminator would be placed above tube bundle 35.

If desired, an eliminator 49 may be disposed in second compartment 46 to further assure complete elimination of any remaining entrained solution. An outlet 50 and a refrigerant vapor line 51 is located above eliminator 49 and leads from second compartment 46 to a condenser 52.

Condenser 52 comprises shell 53 and a sump 55 to collect condensed refrigerant vapor. A plurality of heat exchange tubes 54 are disposed within shell 53. Inlet line 58 and outlet line 59 are provided to pass cooling water which in the case of a seagoing vessel may comprise sea water into tubes 54 to extract heat from the vaporized refrigerant and to condense it. Bypass valve 60 may be provided to bypass cooling fluid around tubes 54, if desired.

From sump 55 condensed refrigerant flows through line 64 and line 65 and is discharged into evaporator pan 20. Lines 66 and 67 connect to evaporator pan 20 adjacent the bottom thereof for the purpose of assuring a drainage of the pan irrespective of the angular position of the absorption machine. It will be observed that a pair of each of lines 66 and 67 should be provided at both ends of pan 20 in order to take care of both pitch and roll conditions of the vessel. Lines 66 and 67 drain substantially all of the refrigerant from pan 20 preventing refrigerant accumulation therein. Lines 66 and 67 discharge into refrigerant storage tank 68 thereby assuring that refrigerant will not be emptied from pan 20 into absorber 10 under severe conditions of pitch and roll.

Pump 69 forwards refrigerant from storage tank 68 back through line 70 to refrigerant distributor 22 for respraying over heat exchange tubes 21 resulting in vaporization and cooling of the liquid refrigerant in the evaporator due to the low pressure in the absorber. It will be understood that absorber 10 is in open communication with evaporator 11 through eliminators 23 and through spaces provided between the bottom of pan 20 and the sides of shell 12 at various suitable locations.

Vaporization or evaporation of refrigerant in evaporator 11 results in cooling of the refrigerant due to the heat which is removed to convert the refrigerant from a liquid state to a vapor state. Consequently, the fluid in heat exchange tubes 21 is continuously cooled by heat exchange with refrigerant in the evaporator. This cooled fluid is then transmitted to suitable remotely located heat exchangers through line 72 for cooling or dehumidification of the desired areas. The warmed fluid which has removed heat from the desired areas is then returned through line 71 to heat exchange tubes 21 for recooling.

The heat of dilution and condensation of the absorbent solution is removed from the absorber by passing sea water or other cooling fluid through inlet 61 to tubes 13 and through outlet 62 where the cooling fluid is passed to heat exchange tubes 54 of the condenser.

Capacity control of the absorption refrigeration machine described may be obtained through control of the concentration of strong solution returned from generator 34 to absorber 10. The concentration of the absorbent solution in turn is controlled by the steam input through line 36 by regulation of steam control valve 74. Bulb 73 or other suitable temperature sensing means is secured to outlet line 72 of evaporator 11 and senses the leaving water temperature from the evaporator. When the heat load to be rejected increases, the leaving water temperature tends to rise. This rise is sensed by bulb 73 which opens steam valve 74 to a position such that it passes more steam to the generator. The additional steam supplied to the generator concentrates the absorbent to a higher degree which in turn increases the capacity of the refrigeration system by increasing the quantity of refrigerant absorbed by the more concentrated solution in the absorber.

To prevent solidification and consequent blocking of heat exchanger 31 by over-concentrated absorbent being cooled therein below the temperature at which it solidifies, a suitable bypass valve 42 may be provided as described in Leonard application Serial No. 2,203, filed January 13, 1960. A purge line 76 and suitable purge 78 are provided adjacent the lower portion of absorber 10 to remove non-condensibles from the refrigeration system.

In operation the present invention provides an absorption refrigeration machine and system which is capable of operating in a plurality of angular positions such as may be encountered due to pitching and rolling of a seagoing vessel. Such a system is particularly advantageous for air conditioning of a submarine where in addition to the usual pitch and roll conditions substantial listing or trim conditions may be experienced. Further advantages of the refrigeration system described reside in its relatively noiseless operation and its rapid recovery rate in the event of extremely severe rolls. An additional important advantage of a refrigeration machine of the type described lies in the fact that neither the refrigerant nor the absorbent are noxious, toxic or otherwise dangerous to personnel so that leakage which might result from damage to the machine does not present a serious personnel hazard.

Because of the physical construction shown, and due to the fact that excess refrigerant is stored in tank 68, very severe angular positions of operation of the refrigeration system do not materially alter the operation of the machine. For example, in contrast with usual constructions, little or no liquid level is maintained in the generator, the liquid level actually being somewhere in line 39 in actual operation. Consequently, even under extremely severe pitch and roll conditions, there is minimum danger of concentrated solution from the generator draining into the condenser to subsequently contaminate the evaporator. There is also little or no danger of refrigerant from the condenser passing into the generator to dilute the intermediate solution in sump 16. Furthermore, because of the unique refrigerant vapor flow path in the generator described, the generator heat exchange tubes serve to eliminate entrained absorbent solution from refrigerant vapor flowing downwardly through the tube bundle. This takes place because the droplets of entrained solution tend to hit the relatively closely spaced generator heat exchange tubes and the droplets adhere to the tubes or coalesce into larger droplets which fall into the generator sump while the refrigerant vapor turns upwardly to pass through the second compartment and the vapor line to the condenser.

While for purposes of illustration, a single preferred embodiment of this invention has been described, it will be understood that this invention may comprise other modifications and embodiments within the scope of the following claims.

I claim:

1. A refrigeration machine of the absorption type comprising an absorber, an evaporator, a condenser, a generator, an absorbent solution and a refrigerant, said generator comprising a first compartment and a second compartment, said first and second compartments being in communication adjacent their respective lower portions, eliminator means in said second compartment, a tube bundle disposed within said first compartment adapted to pass a heating fluid in heat exchange relation with solution in said first compartment, means to pass weak absorbent solution from said absorber to said first compartment, spray means to discharge said weak solution downwardly over said tube bundle to vaporize refrigerant absorbed in said weak solution thereby concentrating said weak solution, means to return the concentrated solution from a portion of said generator to said absorber for reabsorption of refrigerant vapor, said vaporized refrigerant being enabled to pass downwardly through said tube bundle in said first compartment and upwardly through said eliminator means in said second compartment to said condenser for condensation thereof and passage to said evaporator thereby substantially preventing contamination of said evaporator with absorbent.

2. In an absorption refrigeration machine adapted to provide refrigeration in a plurality of angular positions and adapted to contain an absorbent solution and a refrigerant, the combination of an absorber, an evaporator, a condenser and a generator, said generator comprising a shell, vertically extending partition means disposed within said shell dividing the generator into a first compartment and a second compartment, said first and second compartments communicating substantially only adjacent their lower respective portions thereby providing a passage for the passage of refrigerant vapor from said first compartment to said second compartment, a tube bundle disposed within said first compartment, said tube bundle being adapted to pass a heating fluid in heat exchange relation with solution in contact with the exterior surfaces thereof, means to pass weak absorbent solution from said absorber to said first compartment, means to discharge said weak absorbent solution downwardly over said tube bundle to concentrate the solution by vaporizing absorbed refrigerant from the weak solution due to heat exchange with said heating fluid, means to return substantially all of said concentrated solution from said first compartment to said absorber for reabsorption of refrigerant to substantially prevent accumulation of solution in said generator, the refrigerant vapor driven off from said solution being enabled to pass downwardly through said tube bundle in said first compartment and upwardly through said second compartment to said condenser so that entrained solution is eliminated therefrom.

3. An absorption refrigeration machine as defined in claim 2 wherein said generator comprises a tubular shell having a sump at each end thereof extending below the level of the bottom of said shell, each of said sumps being in communication with said absorber section.

4. In an absorption refrigeration machine adapted for use under conditions where it may be required to provide refrigeration in a plurality of angular positions and adapted to contain an absorbent solution and a refrigerant, the combination of an absorber, an evaporator, a condenser shell and a generator shell, said generator shell being spaced from said condenser shell, vertically extending partition means within said generator shell dividing said generator into a first compartment and a second compartment, said first and second compartments having a substantially common bottom portion, said first compartment and said second compartment being in communication substantially only adjacent their respective lower portions to provide means for passing refrigerant vapor from said first compartment to said second compartment, a tube bundle disposed within said first compartment adapted to pass a heating fluid therethrough in heat exchange relation with absorbent solution in contact with the outer surfaces of said tube bundle, spray means disposed in said first compartment above said tube bundle to spray solution downwardly thereon, means to pass weak absorbent solution from said absorber to said first compartment through said spray means and over said tube bundle, an outlet disposed adjacent a lower portion of said generator shell for discharging strong absorbent solution resulting from driving off of refrigerant vapor from weak solution sprayed over said tube bundle due to heat exchange with said heating fluid, means to pass substantially all said strong solution from said generator through said outlet to said absorber for reabsorption of refrigerant to substantially prevent accumulation of solution in said generator, and a refrigerant vapor outlet in said second compartment communicating said second compartment with said condenser to pass refrigerant vapor substantially freed of entrained absorbent solution by its passage downwardly past said tube bundle and upwardly through said second compartment to said condenser for condensation and return thereof to said evaporator.

5. An absorption refrigeration machine as defined in claim 4 including additional entrained vapor eliminator means disposed in said second compartment and wherein said vapor outlet in said second compartment is located above said eliminator means.

6. In an absorption refrigeration machine adapted to provide refrigeration in a plurality of angular positions, the combination of an absorber section, an evaporator section, a generator section and a condenser section, said absorber section and said generator section and said condenser section each being disposed within separate shells, a heat exchange tube bundle disposed in said generator shell, spray means in said generator shell for discharging weak absorbent solution from said absorber over said tube bundle to concentrate the weak solution, means for continually withdrawing substantially all absorbent solution from said generator shell to prevent accumulation of absorbent solution therein, a refrigerant storage tank disposed below said evaporator section for storing refrigerant, means to spray refrigerant liquid into said evaporator section, means to continually withdraw substantially all unvaporized refrigerant from said evaporator section and pass it to said refrigerant storage tank to substantially prevent the accumulation of refrigerant therein, and means to pass refrigerant from said refrigerant storage tank to the evaporator spray means to return refrigerant from said tank to said evapoator so that said refrigeration machine is continuously operable in a plurality of angular positions.

7. A generator for use in an absorption refrigeration machine comprising a first compartment and a second compartment, partition means separating said first compartment from said second compartment, a plurality of heat exchange tubes adapted to carry a heating medium disposed within said first compartment, means to discharge a weak absorbent solution into contact with said heat exchange tubes to vaporize refrigerant from said weak absorbent solution thereby concentrating said absorbent solution, a first vapor passage means extending from said second compartment for passing refrigerant vapor from said second compartment to a condenser, a second vapor passage means for passing vapor from said first compartment into said second compartment, said second vapor passage means being located with respect to said heat exchange tubes and said first vapor passage means so that refrigerant vapor liberated from said weak absorbent solution by contact with said heat exchange tubes flows in one direction past said heat exchange tubes in said first compartment and flows in substantially the opposite direction in said second compartment in order to provide enhanced entrainment elimination while undergoing a change in direction between said first and second chambers.

References Cited in the file of this patent
UNITED STATES PATENTS
2,470,756  Berestneff _____ May 24, 1949